US010502382B1

(12) United States Patent
Shih

(10) Patent No.: US 10,502,382 B1
(45) Date of Patent: Dec. 10, 2019

(54) LASER LAMP WITH WIDE-RANGE IRRADIATING FUNCTION

(71) Applicant: Niken Vehicle Lighting Co., Ltd., Sioushuei Township, Changhua County (TW)

(72) Inventor: Shou-Jen Shih, Sioushuei Township (TW)

(73) Assignee: Niken Vehicle Lighting Co., Ltd., Sioushuei Township (TW)

( * ) Notice: Subject to any disclaimer, the term of this patent is extended or adjusted under 35 U.S.C. 154(b) by 0 days.

(21) Appl. No.: 16/039,395

(22) Filed: Jul. 19, 2018

(51) Int. Cl.

| | |
|---|---|
| ***B23K 26/342*** | (2014.01) |
| ***F21S 41/20*** | (2018.01) |
| ***F21S 41/19*** | (2018.01) |
| ***F21S 45/47*** | (2018.01) |
| ***F21S 45/70*** | (2018.01) |
| ***F21S 41/16*** | (2018.01) |

(52) U.S. Cl.
CPC ............. *F21S 41/285* (2018.01); *F21S 41/16* (2018.01); *F21S 41/192* (2018.01); *F21S 45/47* (2018.01); *F21S 45/70* (2018.01)

(58) Field of Classification Search
None
See application file for complete search history.

(56) References Cited

U.S. PATENT DOCUMENTS 5,500,768 A * 3/1996 Doggett ............... G01N 21/274 359/652
5,615,052 A * 3/1997 Doggett ............... G01N 21/274 359/642
6,664,998 B1 * 12/2003 Kyoya ................. G11B 7/1275 347/241
8,506,103 B2 * 8/2013 Iimura .................... F21V 7/041 362/84

* cited by examiner

*Primary Examiner* — Elmito Breval
(74) *Attorney, Agent, or Firm* — Alan D. Kamrath; Mayer & Williams PC

(57) ABSTRACT

A laser lamp includes a laser device, a prism mounted on the laser device, a fixed base encompassing the laser device, a support bracket mounted on the fixed base, and a lens mounted on the support bracket. The lens includes a first transparent section, a second transparent section located at a front end of the first transparent section, and a third transparent section located at a front end of the second transparent section. The second transparent section is a freeform optics and is provided with two first arcuate faces and two second arcuate faces. The two first arcuate faces are curved backward and have two symmetrical sides. The two second arcuate faces are curved forward and have two symmetrical sides. The third transparent section of the lens has an arcuate face and is curved forward.

10 Claims, 12 Drawing Sheets

LASER LAMP WITH WIDE-RANGE IRRADIATING FUNCTION

BACKGROUND OF THE INVENTION

1. Field of the Invention

The present invention relates to a lighting tool and, more particularly, to a laser lamp.

2. Description of the Related Art

A laser lamp is available for a car to provide an illuminating function. Preferably, the laser lamp is mounted on the front portion of the car to function as a headlight. A conventional laser lamp comprises a laser device and a prism mounted on the front end of the laser device. When the laser light generated by the laser device passes through the prism, the laser light is converted into a white light by provision of the prism so that the white light is emitted outward to provide the illuminating function. Thus, the laser lamp replaces the conventional headlight, such as a halogen light or an LED light. However, when the user needs to enhance the lighting areas at the two sides of the headlight, it is necessary to provide multiple sets of laser lamps to satisfy the practical requirement, thereby increasing the cost. In addition, the laser lamps produce much heat so that it is necessary to provide a cooling system to cool down the laser lamps, thereby greatly increasing the cost.

BRIEF SUMMARY OF THE INVENTION

The primary objective of the present invention is to provide a laser lamp with a wide-range irradiating function by changing refraction of the light.

In accordance with the present invention, there is provided a laser lamp comprising a laser device, a fixed base, a support bracket and a lens. The laser device is provided with a light generating section. The laser device is provided with a light outlet. A prism is mounted on the light outlet of the laser device. The laser device is provided with a positioning plate. The fixed base encompasses the laser device. The fixed base is provided with a guide port aligning with the light outlet of the laser device. The fixed base is provided with an extension resting on the positioning plate. The support bracket is mounted on the fixed base. The support bracket is provided with a receiving hole aligning with the light outlet of the laser device, with a predetermined distance being defined between the light outlet of the laser device and the receiving hole of the support bracket. The lens is mounted in the receiving hole of the support bracket. The lens includes a first transparent section received in the receiving hole of the support bracket, a second transparent section located at a front end of the first transparent section, and a third transparent section located at a front end of the second transparent section. The second transparent section of the lens is a freeform optics and is provided with two first arcuate faces and two second arcuate faces. The two first arcuate faces of the second transparent section of the lens are curved backward and have two symmetrical sides. The two second arcuate faces of the second transparent section of the lens are curved forward and have two symmetrical sides. The third transparent section of the lens has an arcuate face and is curved forward.

According to the primary advantage of the present invention, the two first arcuate faces of the second transparent section provide a diverging effect, the two second arcuate faces of the second transparent section provide a converging effect, and the third transparent section provides a focusing effect, so that the light source generated by the laser device has a wider irradiating angle and a longer irradiating distance by provision of the lens.

According to another advantage of the present invention, when the detector detects that the harmful rays of the laser device are emitted or leak, the detector shuts the power supply of the laser device instantaneously, so as protect the user's safety.

According to a further advantage of the present invention, when the laser device fails or shuts, the at least one lamp body of the auxiliary lamp base provides an illuminating function successively.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
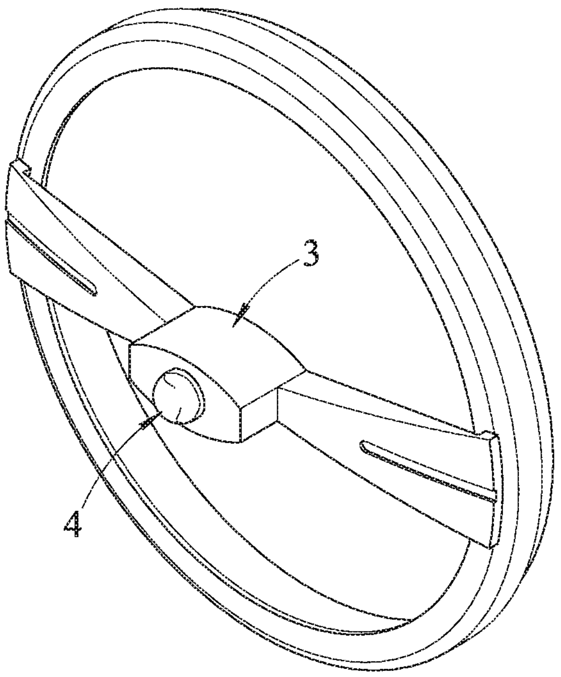
FIG. 1 is a perspective view of a laser lamp in accordance with the preferred embodiment of the present invention.
Figure 2:
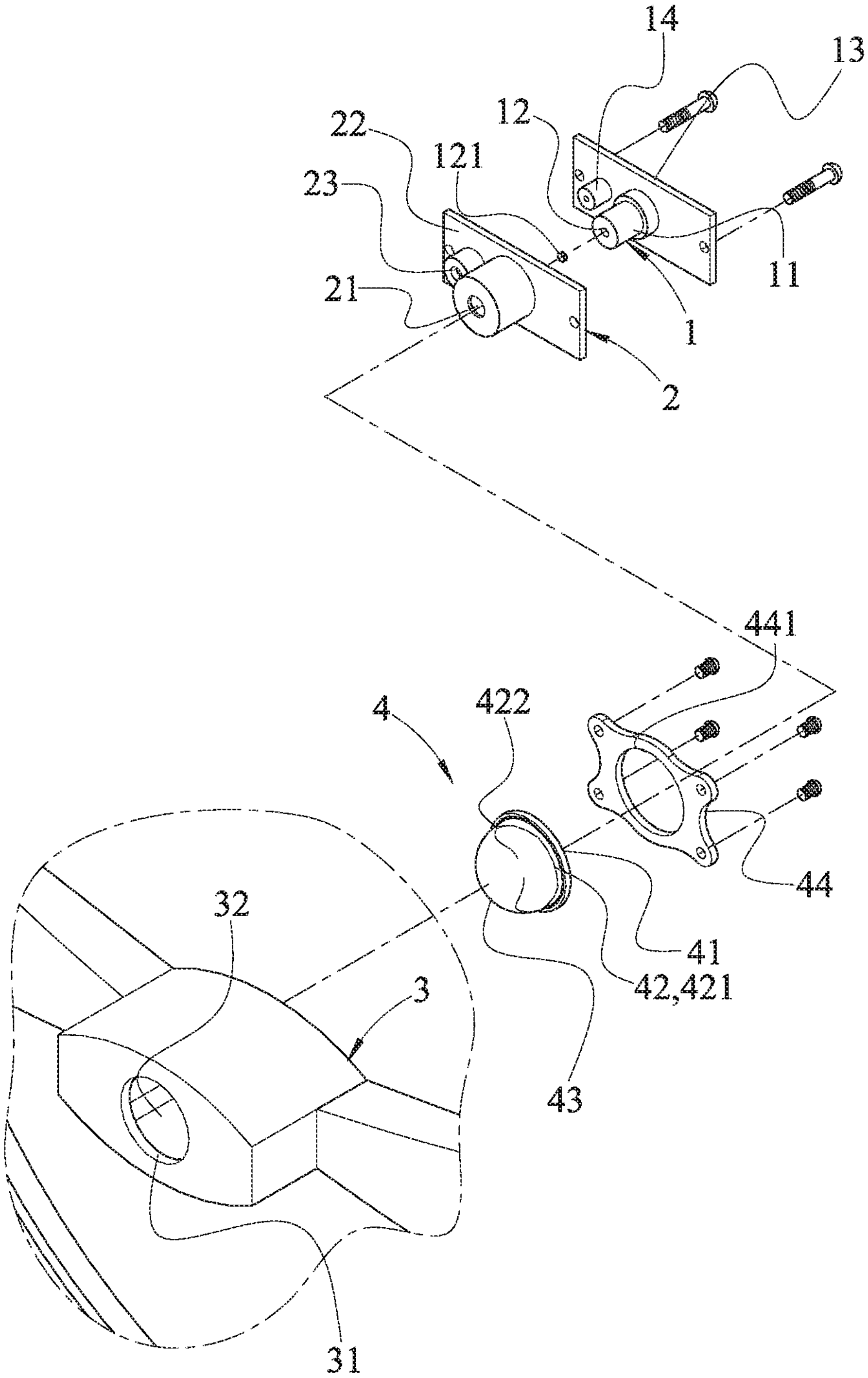
FIG. 2 is an exploded perspective view of the laser lamp in accordance with the preferred embodiment of the present invention.
Figure 3:
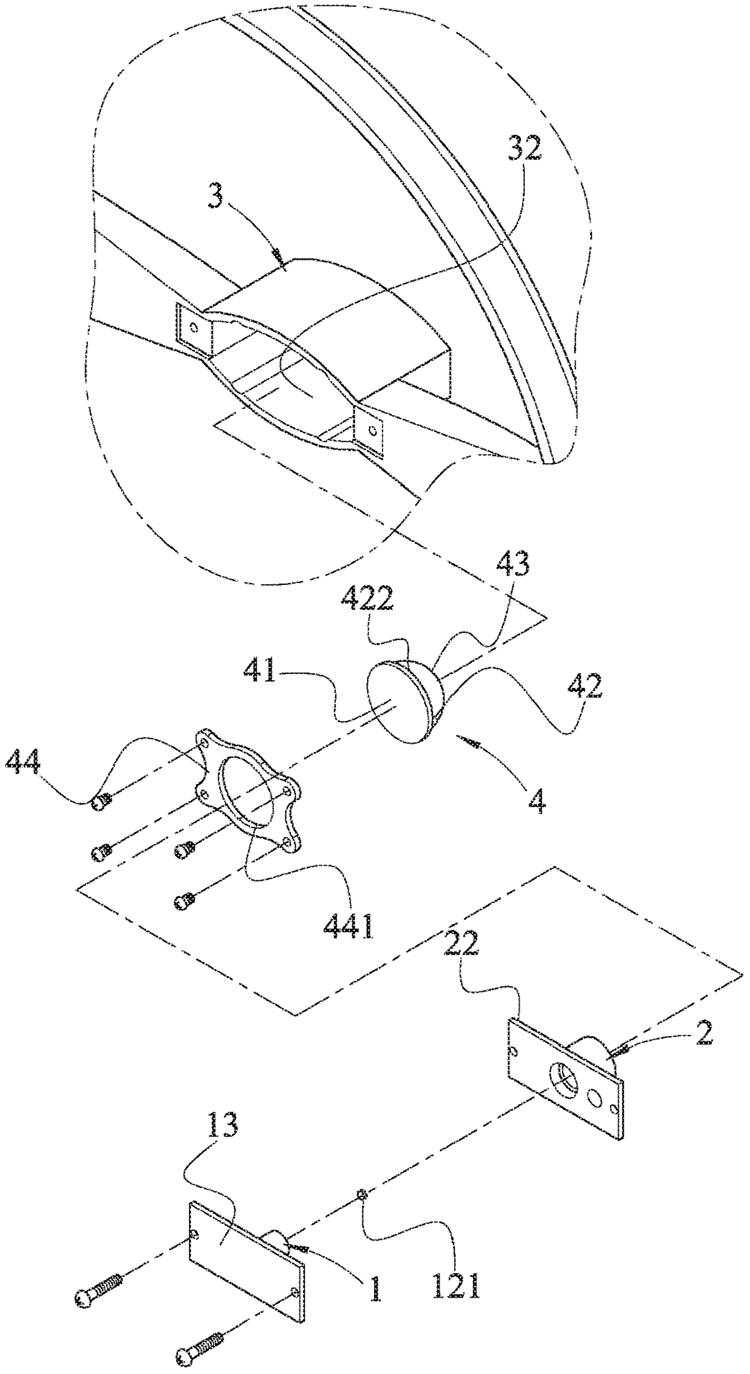
FIG. 3 is another exploded perspective view of the laser lamp in accordance with the preferred embodiment of the present invention.
Figure 4:
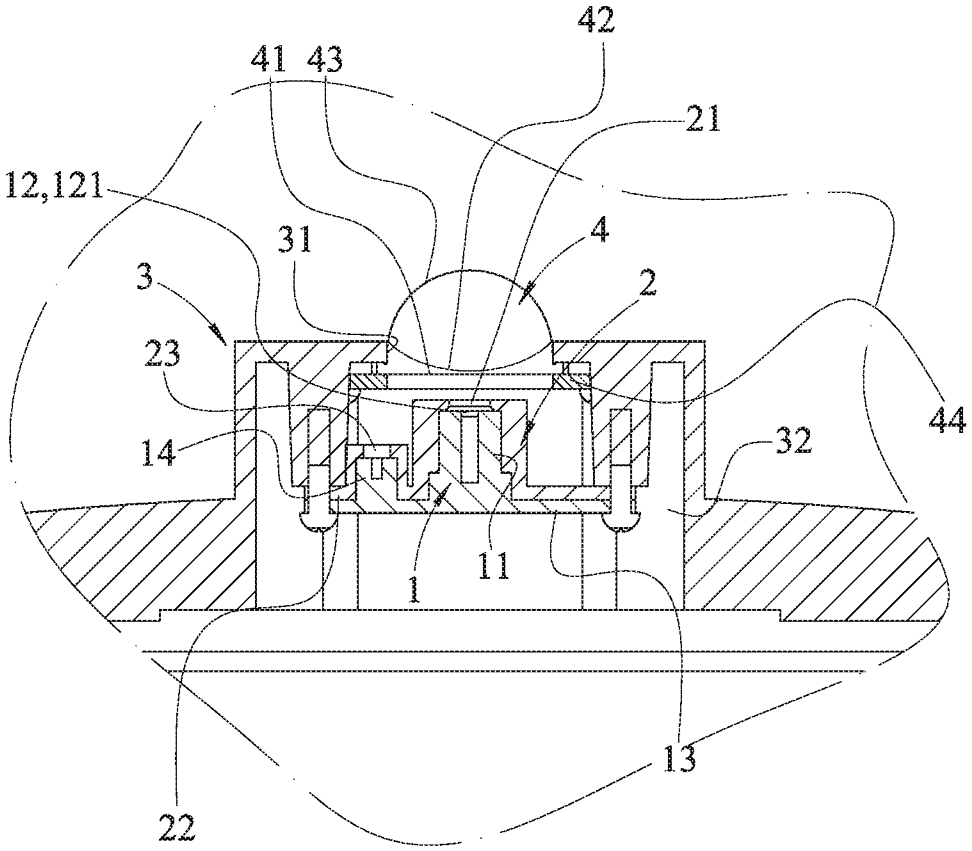
FIG. 4 is a locally enlarged cross-sectional view of the laser lamp in accordance with the preferred embodiment of the present invention.
Figure 5:
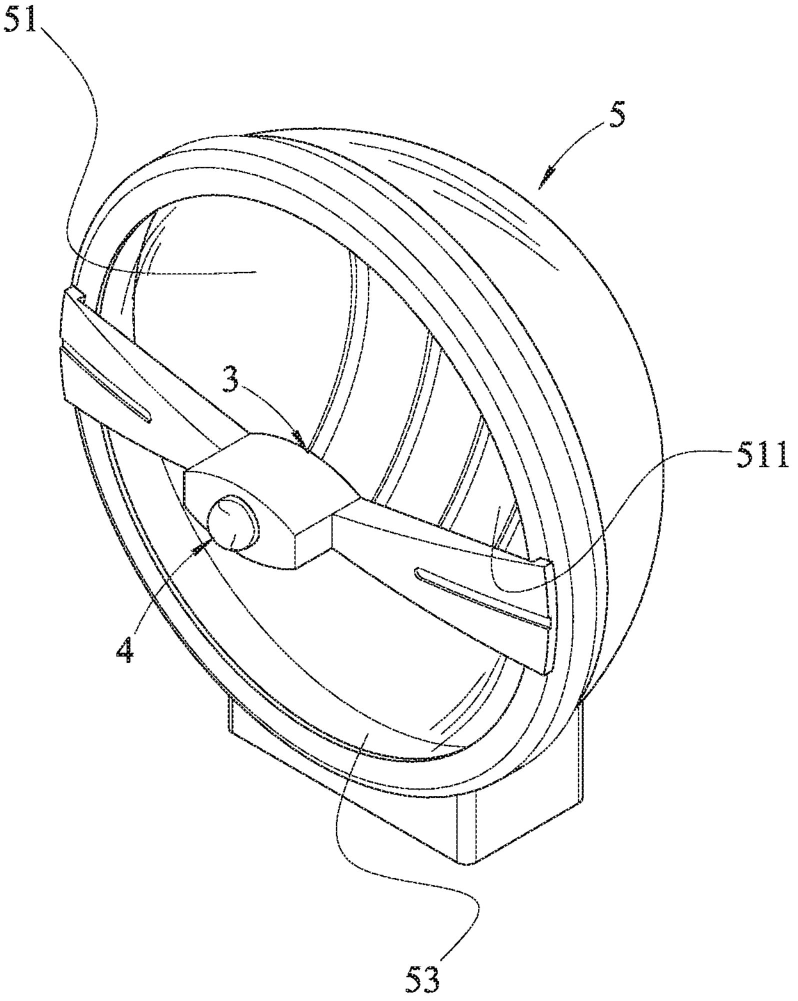
FIG. 5 is a perspective view of a laser lamp in accordance with another preferred embodiment of the present invention.
Figure 6:
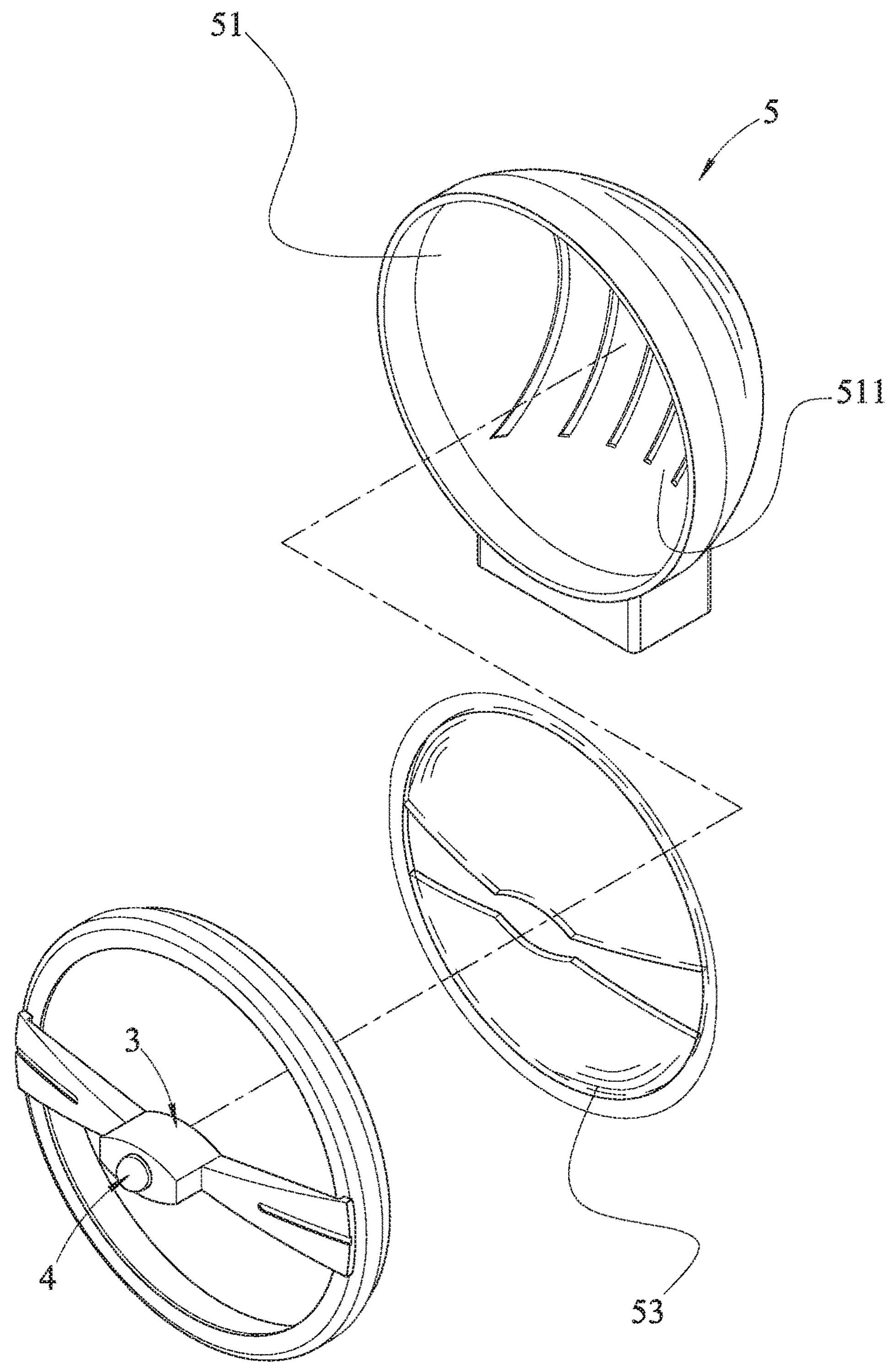
FIG. 6 is an exploded perspective view of the laser lamp as shown in FIG. 5.
Figure 7:
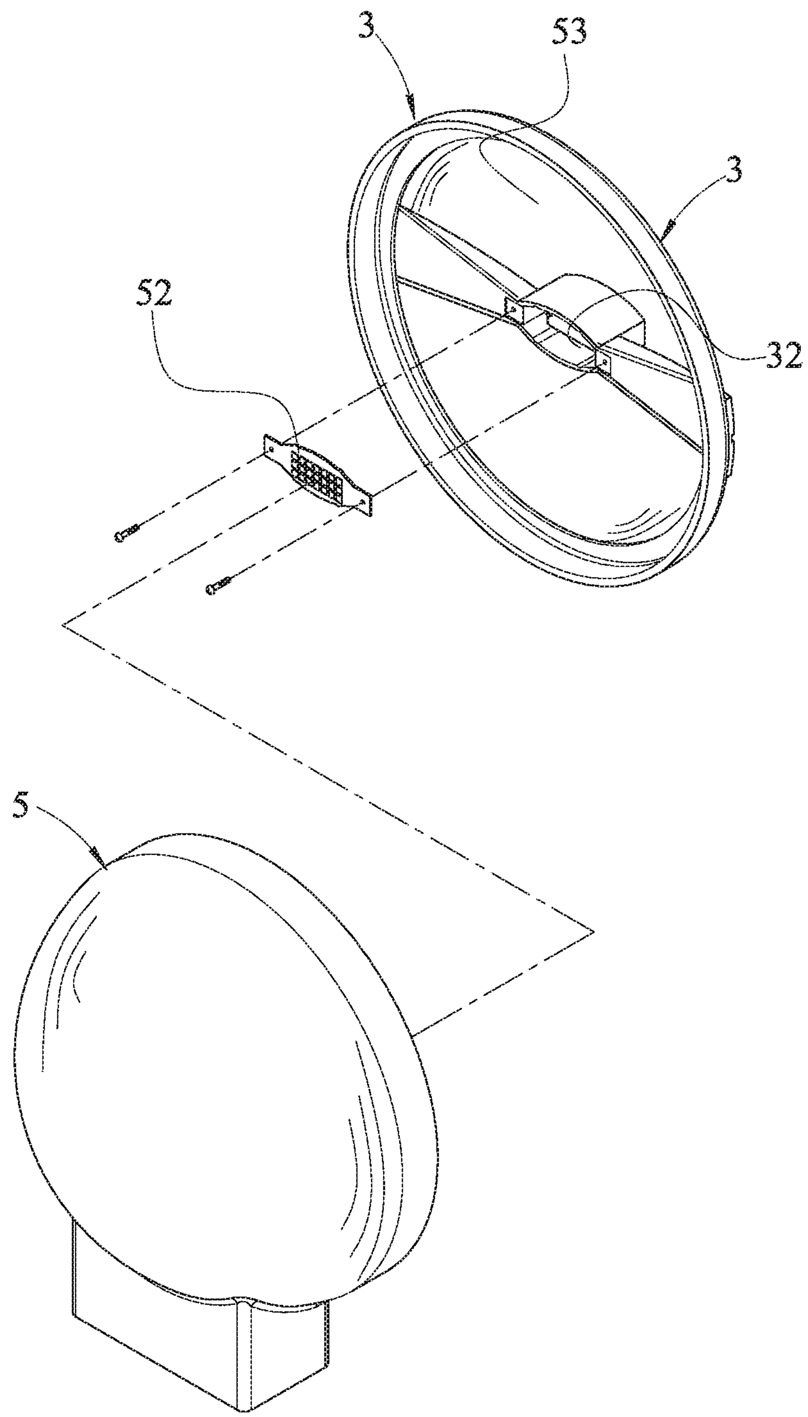
FIG. 7 is another exploded perspective view of the laser lamp as shown in FIG. 5.
Figure 8:
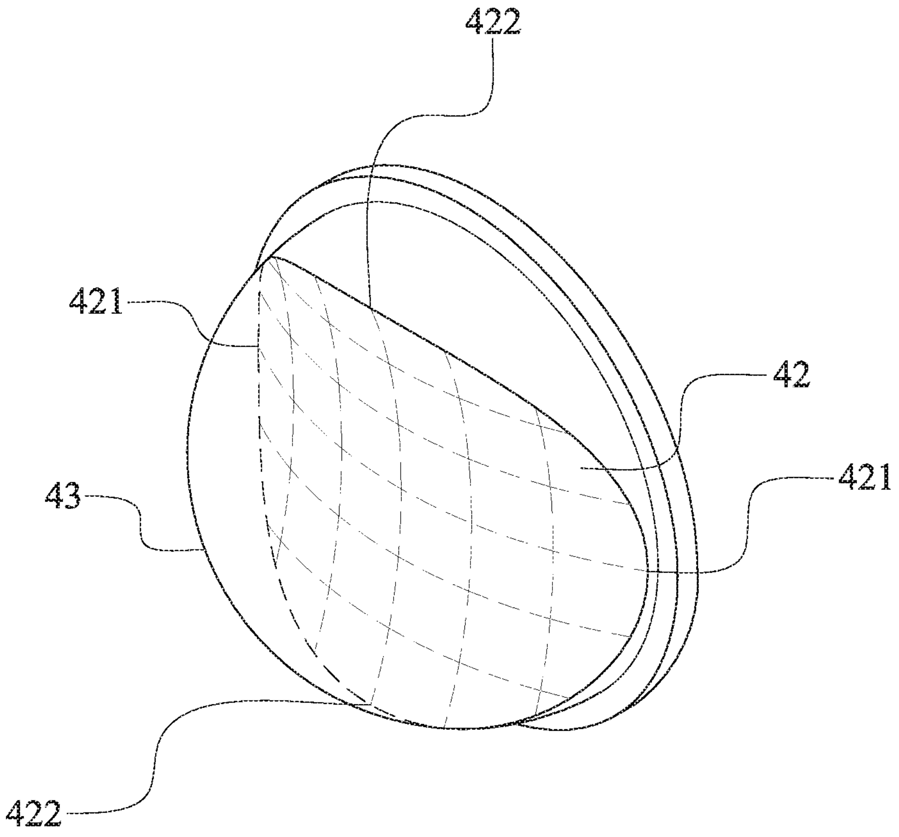
FIG. 8 is a perspective view of a lens of the laser lamp in accordance with the preferred embodiment of the present invention.
Figure 9:
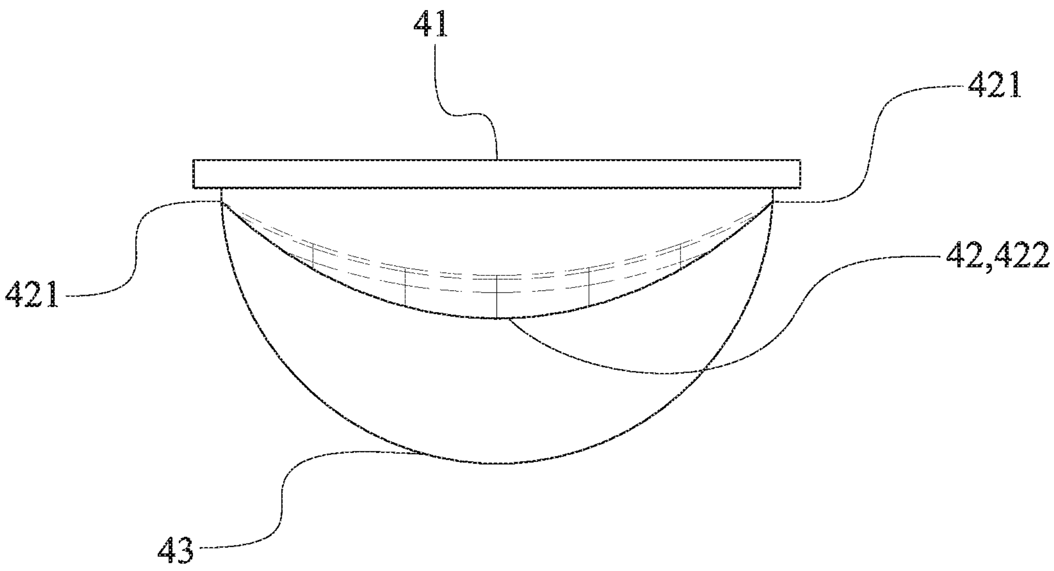
FIG. 9 is a top view of the lens in accordance with the preferred embodiment of the present invention.
Figure 10:
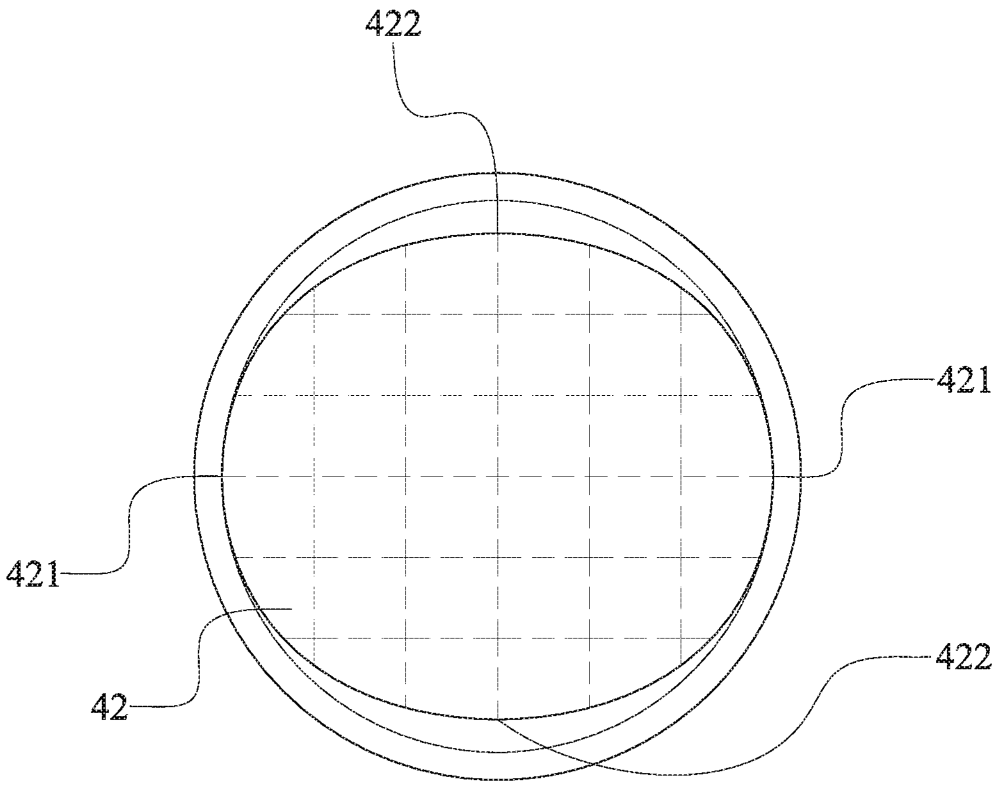
FIG. 10 is a front view of the lens in accordance with the preferred embodiment of the present invention.
Figure 11:
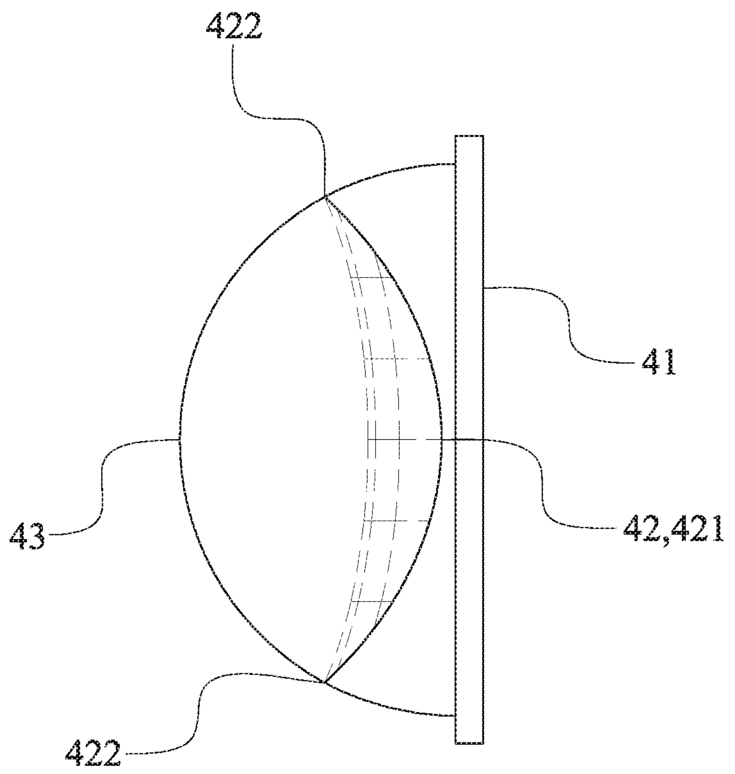
FIG. 11 is a side view of the lens in accordance with the preferred embodiment of the present invention.

Referring to the drawings and initially to FIGS. 1-11, a laser lamp in accordance with the preferred embodiment of the present invention comprises a laser device 1, a fixed base 2, a support bracket 3 and a lens 4.

The laser device 1 is provided with a light generating section 11 for generating a laser light. The laser device 1 has a front end provided with a light outlet 12 to allow emission of the laser light. A prism 121 is mounted on the light outlet 12 of the laser device 1 to allow the laser light forming a white light which provides illumination. The laser device 1 has a rear end provided with a positioning plate 13.

The fixed base 2 has a recessed shape and encompasses the laser device 1. The fixed base 2 is provided with a guide port 21 aligning with the light outlet 12 of the laser device 1, and the light outlet 12 of the laser device 1 is exposed from the guide port 21 of the fixed base 2. The fixed base 2 is provided with an outward protruding extension 22 located at the rear end of the laser device 1 and resting on the positioning plate 13.

The support bracket 3 is mounted on the fixed base 2. The support bracket 3 is provided with a receiving hole 31 aligning with the light outlet 12 of the laser device 1, and a predetermined distance is defined between the light outlet 12 of the laser device 1 and the receiving hole 31 of the support bracket 3.

The lens 4 is mounted in the receiving hole 31 of the support bracket 3. The lens 4 includes a first transparent section 41 received in the receiving hole 31 of the support bracket 3, a second transparent section 42 located at a front end of the first transparent section 41, and a third transparent section 43 located at a front end of the second transparent section 42. The second transparent section 42 of the lens 4 is a freeform optics and is provided with two first arcuate faces 421 and two second arcuate faces 422. The two first arcuate faces 421 of the second transparent section 42 of the lens 4 are curved backward and have two symmetrical sides. The two second arcuate faces 422 of the second transparent section 42 of the lens 4 are curved forward and have two symmetrical sides. Thus, the two first arcuate faces 421 and the two second arcuate faces 422 of the second transparent section 42 of the lens 4 construct a shape of a potato chip. The third transparent section 43 of the lens 4 has an arcuate face and is curved forward.

In the preferred embodiment of the present invention, the two first arcuate faces 421 and the two second arcuate faces 422 of the second transparent section 42 of the lens 4 have different refraction indexes. Thus, when the light passes through the two first arcuate faces 421 and the two second arcuate faces 422 of the second transparent section 42, the two first arcuate faces 421 and the two second arcuate faces 422 of the second transparent section 42 produce different refracting effects.

In the preferred embodiment of the present invention, the laser lamp further comprises an auxiliary lamp base 5 combined with the support bracket 3. The auxiliary lamp base 5 has a recessed shape and has a receiving space 51 defined between the auxiliary lamp base 5 and the support bracket 3. The receiving space 51 of the auxiliary lamp base 5 has a peripheral wall provided with a reflective face 511 (see FIG. 6). At least one lamp body 52 (see FIG. 7) is mounted on the support bracket 3 and received in the receiving space 51.

In the preferred embodiment of the present invention, the at least one lamp body 52 is located at a rear end of the support bracket 3 and directed toward the reflective face 511 of the auxiliary lamp base 5.

In the preferred embodiment of the present invention, a transparent light permeable member 53 is mounted between the support bracket 3 and the auxiliary lamp base 5.

In the preferred embodiment of the present invention, the third transparent section 43 of the lens 4 is a freeform optics.

In the preferred embodiment of the present invention, the laser device 1 is provided with a detector 14. The detector 14 is located on the positioning plate 13 and is electrically connected with the laser device 1. The fixed base 2 is provided with a detection opening 23 covering the detector 14.

In the preferred embodiment of the present invention, the detector 14 is a blue-light detector, a temperature sensor or a combination of the blue-light detector and the temperature sensor.

In the preferred embodiment of the present invention, the fixed base 2 is made of heatsink material. Preferably, the fixed base 2 is made of copper.

In the preferred embodiment of the present invention, a stop member 44 is mounted on a rear end of the lens 4 and secured in the support bracket 3 to position the lens 4 in the receiving hole 31 of the support bracket 3. The stop member 44 is provided with a through hole 441 to allow passage of the laser light.

In the preferred embodiment of the present invention, the support bracket 3 has a housing shape and is provided with a recess 32. The fixed base 2 is mounted in the recess 32 of the support bracket 3. The laser device 1 is mounted in the recess 32 of the support bracket 3.

In operation, the laser lamp is available for a car to provide an illuminating function. When the laser light generated by the light generating section 11 of the laser device 1 passes through the light outlet 12 of the laser device 1, the laser light forms a steady-state light source (the white light) by provision of the prism 121 that is mounted in the light outlet 12. Then, the light source is emitted from the guide port 21 of the fixed base 2 and enters the lens 4 that is mounted in the receiving hole 31 of the support bracket 3. Then, the light source passes through the first transparent section 41, the second transparent section 42 and the third transparent section 43 of the lens 4. Finally, the light source is focused in and emitted from the third transparent section 43 of the lens 4. When the light source passes through the second transparent section 42 of the lens 4, the light source is refracted successively by the two first arcuate faces 421 and the two second arcuate faces 422 of the second transparent section 42. In such a manner, the light source presents a divergent state by the two first arcuate faces 421 and presents a convergent state by the two second arcuate faces 422, so that the light source forms an elliptical irradiating path. Thus, the light source is refracted by the two first arcuate faces 421 and the two second arcuate faces 422 of the second transparent section 42 of the lens 4, and is focused by the third transparent section 43 of the lens 4, so that the light source generated by the laser light of the laser lamp has a wide irradiating angle and a long irradiating distance.

It is appreciated that, when the prism 121 is worn out or detached from the light outlet 12 of the laser device 1, a blue light (or harmful rays) of the laser light generated by the light generating section 11 of the laser device 1 is emitted outward and projected onto the lens 4 and the stop member 44. At this time, the blue light is refracted and reflected by the lens 4 and the stop member 44, so that when the detector 14 detects the abnormal condition of the prism 121, the detector 14 that is electrically connected with the laser device 1 shuts the power supply of the laser device 1 instantaneously, to prevent the laser light from being emitted directly, and to protect the user's safety. In addition, the detector 14 functions as a temperature sensor that shuts the power supply of the laser device 1 when the temperature is too high. Further, the detector 14 is mounted in the recess 32 of the support bracket 3, so that the detector 14 is not interrupted by ambient rays.

Besides, the at least one lamp body 52 cooperates with the reflective face 511 of the auxiliary lamp base 5 to provide a distal irradiating function. In addition, the transparent light permeable member 53 is mounted between the support bracket 3 and the auxiliary lamp base 5 to avoid invasion of foreign objects, such as insects and the like, and to provide a dustproof function.

Accordingly, the two first arcuate faces 421 of the second transparent section 42 provide a diverging effect, the two second arcuate faces 422 of the second transparent section 42 provide a converging effect, and the third transparent section 43 provides a focusing effect, so that the light source generated by the laser device 1 has a wider irradiating angle and a longer irradiating distance by provision of the lens 4. In addition, when the detector 14 detects that the harmful rays of the laser device 1 are emitted or leak, the detector 14 shuts the power supply of the laser device 1 instantaneously, so as protect the user's safety. Further, when the laser device 1 fails or shuts, the at least one lamp body 52 of the auxiliary lamp base 5 provides an illuminating function successively.

Figure 12:
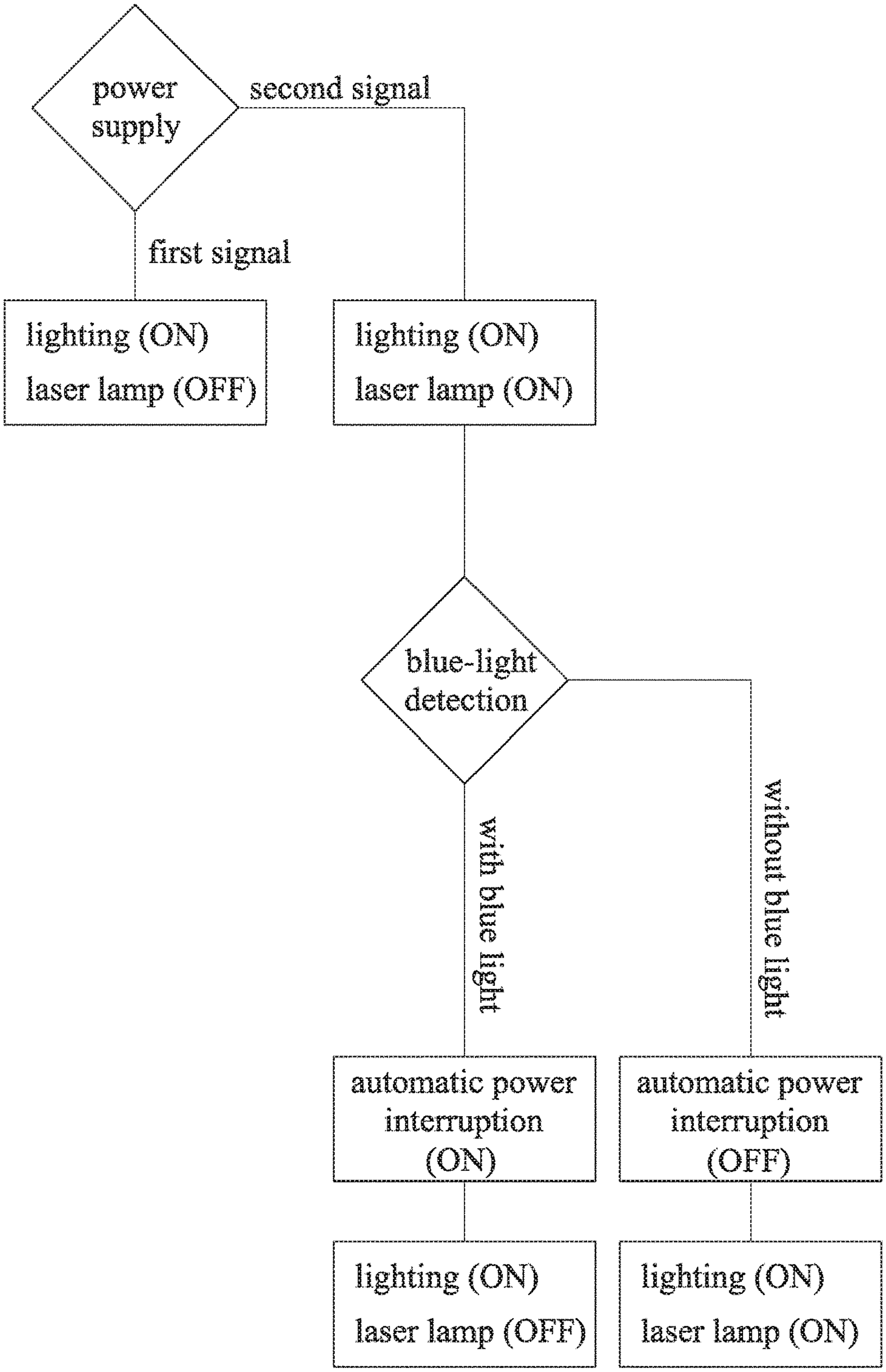
FIG. 12 is a block diagram showing operation of the laser lamp in accordance with the preferred embodiment of the present invention.

Referring to FIG. 12 with reference to FIGS. 1-11, the power supply of the laser device 1 is transmitted by a first signal or a second signal. When the power supply of the laser device 1 is transmitted by the first signal, a common lighting is turned on, and the laser lamp is turned off. When the power supply of the laser device 1 is transmitted by the second signal, the common lighting is turned on, and the laser lamp is turned on. At this time, blue-light detection proceeds successively. In such a manner, when the detector 14 detects that the blue light exists, an automatic power interruption system is turned on, so that the common lighting is still turned on, and the laser lamp is turned off. Alternatively, when the detector 14 detects that the blue light does not exist, the automatic power interruption system is turned off, so that the common lighting is still turned on, and the laser lamp is still turned on. Thus, the laser lamp cooperates with a circuit so that the laser lamp is modularized and has an automatic power interruption function.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A laser lamp comprising:

a laser device, a fixed base, a support bracket and a lens; wherein:

the laser device is provided with a light generating section;

the laser device is provided with a light outlet;

a prism is mounted on the light outlet of the laser device;

the laser device is provided with a positioning plate;

the fixed base encompasses the laser device;

the fixed base is provided with a guide port aligning with the light outlet of the laser device;

the fixed base is provided with an extension resting on the positioning plate;

the support bracket is mounted on the fixed base;

the support bracket is provided with a receiving hole aligning with the light outlet of the laser device, with a predetermined distance being defined between the light outlet of the laser device and the receiving hole of the support bracket;

the lens is mounted in the receiving hole of the support bracket;

the lens includes a first transparent section received in the receiving hole of the support bracket, a second transparent section located at a front end of the first transparent section, and a third transparent section located at a front end of the second transparent section;

the second transparent section of the lens is a freeform optics and is provided with two first arcuate faces and two second arcuate faces;

the two first arcuate faces of the second transparent section of the lens are curved backward and have two symmetrical sides;

the two second arcuate faces of the second transparent section of the lens are curved forward and have two symmetrical sides; and the third transparent section of the lens has an arcuate face and is curved forward.

2. The laser lamp of claim 1, further comprising:

an auxiliary lamp base combined with the support bracket;

wherein:

the auxiliary lamp base has a recessed shape and has a receiving space defined between the auxiliary lamp base and the support bracket;

the receiving space of the auxiliary lamp base has a peripheral wall provided with a reflective face; and at least one lamp body is mounted on the support bracket and received in the receiving space.

3. The laser lamp of claim 2, wherein the at least one lamp body is located at a rear end of the support bracket and directed toward the reflective face of the auxiliary lamp base.

4. The laser lamp of claim 2, wherein a transparent light permeable member is mounted between the support bracket and the auxiliary lamp base.

5. The laser lamp of claim 1, wherein the third transparent section of the lens is a freeform optics.

6. The laser lamp of claim 1, wherein:

the laser device is provided with a detector;

the detector is located on the positioning plate and is electrically connected with the laser device; and the fixed base is provided with a detection opening covering the detector.

7. The laser lamp of claim 6, wherein the detector is a blue-light detector, a temperature sensor or a combination of the blue-light detector and the temperature sensor.

8. The laser lamp of claim 1, wherein the fixed base is made of heatsink material.

9. The laser lamp of claim 1, wherein:

a stop member is mounted on a rear end of the lens and secured in the support bracket to position the lens in the receiving hole of the support bracket; and the stop member is provided with a through hole.

10. The laser lamp of claim 1, wherein:

the support bracket has a housing shape and is provided with a recess;

the fixed base is mounted in the recess of the support bracket; and the laser device is mounted in the recess of the support bracket.

* * * * *